United States Patent [19]

Greene et al.

[11] Patent Number: 5,433,845
[45] Date of Patent: Jul. 18, 1995

[54] FLOW CONTROL BYPASS BASIN APPARATUS

[75] Inventors: Boyd B. Greene; Naji J. Nassif, both of Memphis, Tenn.

[73] Assignee: Newberry Tanks & Equipment, Inc., West Memphis, Ark.

[21] Appl. No.: 253,736

[22] Filed: Jun. 3, 1994

[51] Int. Cl.⁶ .............................................. B01D 21/24
[52] U.S. Cl. .................................. 210/170; 210/257.1; 210/305; 210/532.1; 210/540; 137/561 A
[58] Field of Search ............... 210/170, 299, 305, 519, 210/521, 532.1, 538, 540, 539, 257.1; 137/561 A

[56] References Cited

U.S. PATENT DOCUMENTS

| | | | |
|---|---|---|---|
| 1,734,777 | 11/1929 | Pike | 210/532.1 |
| 2,071,160 | 2/1937 | Boosey | 210/532.1 |
| 2,076,380 | 4/1937 | Marsh | 210/532.1 |
| 2,284,737 | 6/1942 | Hirshstein | 210/540 |
| 2,288,989 | 7/1942 | Boosey | 210/538 |
| 2,479,386 | 8/1949 | Matheis | 210/540 |
| 2,644,584 | 7/1953 | Johnson | 210/540 |
| 3,527,348 | 9/1970 | LaLonde et al. | 210/540 |
| 3,862,040 | 1/1975 | Preus et al. | 210/540 |
| 4,303,350 | 12/1981 | Dix | 210/170 |
| 4,422,931 | 12/1983 | Wolde-Michael | 210/532.1 |
| 4,578,188 | 3/1986 | Cousino | 210/170 |
| 4,684,467 | 8/1987 | Cloud | 210/532.1 |
| 4,689,145 | 8/1987 | Matthews et al. | 210/299 |
| 4,736,827 | 7/1988 | Mayer | 210/170 |
| 4,789,487 | 12/1988 | Wallace | 210/170 |
| 4,915,823 | 4/1990 | Hall | 210/519 |
| 4,919,568 | 4/1990 | Hurley | 210/170 |
| 5,204,000 | 4/1993 | Steadman et al. | 210/519 |
| 5,229,015 | 7/1993 | Keep et al. | 210/540 |
| 5,236,585 | 8/1993 | Fink | 210/521 |
| 5,266,191 | 11/1993 | Greene et al. | 210/521 |

Primary Examiner—Christopher Upton
Attorney, Agent, or Firm—Walker, McKenzie & Walker

[57] ABSTRACT

In combination, a flow control bypass basin for receiving rainfall runoff water from a surface, an immiscible liquids separator downstream of the bypass basin, and a drain. The bypass basin passes the initial, dirty and oily, portion of the rainfall runoff to the separator and bypasses subsequent runoff water instead to the drain. The bypass basin includes a tank, an inlet in communication with the tank's interior, a primary outlet from the bypass basin to the separator, and a bypass outlet from the bypass basin to the drain, with the bypass outlet being located a substantial height above the primary outlet. Interposed between the bypass outlet and the interior of the tank is a riser tube having a mouth disposed in the lower portion of the tank and an upper end closed to the interior of the tank but open to the bypass outlet. The bypass outlet is located a certain hydraulic head height above the liquid level in the separator such that all water within the bypass basin above that height is bypassed into the drain. The primary outlet is substantially smaller than the inlet to the bypass basin so that the initial dirty portion of the rainfall runoff is accumulated within the bypass basin's tank. Vent pipes prevent pressure buildup within the bypass basin and siphoning by the riser tube, and a baffle having a upwardly-extending screen prevents trash from flowing from the inlet of the bypass basin to the primary and bypass outlets.

16 Claims, 2 Drawing Sheets

FLOW CONTROL BYPASS BASIN APPARATUS

BACKGROUND OF THE INVENTION

1. Field of the Invention

The present invention relates, in general, to separating two immiscible fluids, such as oil and water, front each other, and in particular, to a device for accumulating oily runoff water from a surface such as a parking lot and passing a portion of that water to an immiscible fluids separator.

2. Information Disclosure Statement

Separators for separating immiscible fluids, such as oil and water, from each other are well-known. An example of such a separator is given in Greene et al., U.S. Pat. No. 5,266,191, issued Nov. 30, 1993, and assigned to the assignee of the present invention.

Some have attempted to use immiscible liquid separators to process runoff water from a surface, such as a parking lot or the roof of a building, in order to prevent the oils, etc., that have accumulated on that surface from passing into a municipality's sewage system or a nearby river and causing environmental damage. Such accumulation can happen as oils drip front cars onto the parking lot, or as oils drip from machinery on the roof of the building. When rainfall occurs, the initial runoff water from the surface washes the oil from the surface, and subsequent runoff water during the same storm is relatively clean. It is impractical to design and dedicate an immiscible liquids separator for the task of processing all of the vast quantity of runoff water that might flow from the surface during any expected possible rainfall, because such a separator would be huge and the enormous capacity that would be required of such a separator would only rarely be required during peak rainfall activity, whereas the volume of oily runoff water that truly would need to be processed is relatively small, appearing during the initial moments of the rainstorm.

It is therefore desirable to have an apparatus that allows the use of a smaller immiscible liquids separator than would be otherwise possible, that will direct the dirty initial runoff water to the separator, and that will bypass the separator and direct subsequent and relatively clean runoff water into a drain. Such a bypass should only occur when the rated flow capacity of the separator might be exceeded, and means should also be provided to ensure that the rated flow capacity of the separator is not, in fact, exceeded. Such a bypass should also only be of the subsequent and relatively clean runoff water, and not of the dirty initial runoff water.

A preliminary patentability search in Class 210, subclasses S 13, 519, 521, 532.1, 538, 539, 540, and 799, produced the following patents, some of which may be relevant to the present invention: Pike, U.S. Pat. No. 1,734,777, issued Nov. 5, 1929; Boosey, U.S. Pat. No. 2,071,160, issued Feb. 16, 1937; Marsh, U.S. Pat. No. 2,076,380, issued Apr. 6, 1937; Hirshstein, U.S. Pat. No. 2,284,737, issued Jun. 2, 1942; Boosey, U.S. Pat. No. 2,288,989, issued Jun. 26, 1941; Mathels, U.S. Pat. No. 2,479,386, issued Aug. 16, 1949; Johnson, U.S. Pat. No. 2,644,584, issued Jul. 7, 1953; LaLonde et al., U.S. Pat. No. 3,527,348, issued Sep. 8, 1970; Preus et al., U.S. Pat. No. 3,862,040, issued Jan. 21, 1975; Wolde-Michael, U.S. Pat. No. 4,422,931, issued Dec. 27, 1983; Cloud, U.S. Pat. No. 4,684,467, issued Aug. 4, 1987; Hall, U.S. Pat. No. 4,915,823, issued Apr. 10, 1990; Keep et al., U.S. Pat. No. 5,229,015, issued Jul. 20, 1993; Fink, U.S. Pat. No. 5,236,585, issued Aug. 17, 1993; and Steadman et al., U.S. Pat. No. 5,204,000, issued Apr. 20, 1993.

SUMMARY OF THE INVENTION

The present invention is a flow control bypass basin apparatus for receiving runoff water during a rainstorm from a surface, such as a parking lot, and for accumulating and passing the initial and dirty first portion of the runoff water to an inmiscible liquids separator, and for bypassing a cleaner second portion of the runoff water not to the separator but instead to a drain. The bypass basin comprises a tank having an inlet that empties the runoff water into a lower portion of the interior of the tank, a primary outlet from the bypass basin to the downstream separator, and a bypass outlet to a drain for bypassing clean water to the drain. The primary outlet has a smaller transverse cross-sectional area than the inlet to the tank, so that runoff water accumulates in the tank because of the greater flow into the tank through the inlet than out through the primary outlet.

The bypass outlet is located a certain height above the primary outlet, and receives water from a lower portion of the tank through a riser tube interposed between the bypass outlet and the lower portion of the tank, with the riser tube having an open end disposed in the lower portion of the tank. The bypass outlet has a transverse cross-sectional area such that the sum of the transverse cross-sectional area of the bypass outlet plus the transverse cross-sectional area of the primary outlet is at least as large as the transverse cross-sectional area of the inlet.

Such a construction causes the dirty initial water to pass into the separator or to be accumulated within the bypass basin for subsequent metering to the separator, and bypasses the cleaner runoff water, which appears after the surface has been washed by the initial runoff water of the rainstorm, into the drain during peak periods of the rainstorm, thereby allowing a much smaller separator to be used than would otherwise be possible.

It is an object of the present invention to provide means for accumulating and passing the initial dirty runoff water from a surface, such as a parking lot, into an immiscible liquids separator, and also to provide means for bypassing the cleaner runoff water, subsequent to the initial dirty runoff water, into a drain during the peak periods of a rainstorm. Another object of the present invention is to provide means for ensuring that the maximum rated flow capacity of the downstream separator is not exceeded during peak periods of rainfall intensity. Still a further object of the present invention is to allow the use of a smaller immiscible liquids separator to treat rainfall water than heretofore possible, with the separator being sized only large enough to handle the expected initial volume of dirty runoff water rather than being sized for a much larger flow capacity sufficient for the entire volume of runoff water.

DESCRIPTION OF THE PREFERRED EMBODIMENT

Figure 1:
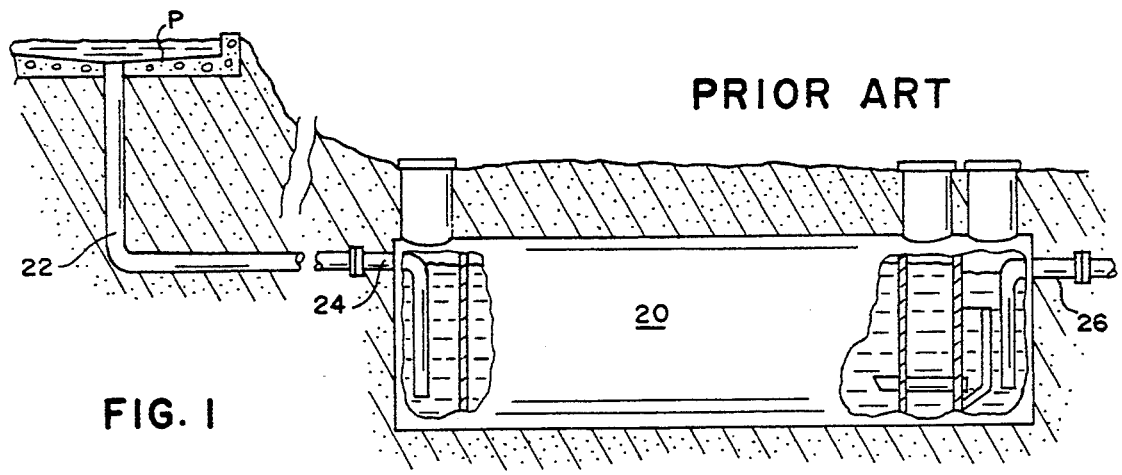
FIG. 1 is a side sectional view of a prior art immiscible liquids separator as might be used in combination with the present invention.

FIG. 1 is a side sectional view of a prior art immiscible liquids separator 20 such as might be used in combination with the present invention. It shall be understood that, while this disclosure uses oil and water as an example of two immiscible liquids of differing density, the problems faced by the present invention and its novel solution are equally applicable to other immiscible liquids of differing densities (buoyancies), in a manner that those skilled in the art will readily recognize. The separator shown in FIG. 1 is that described in U.S. Pat. No. 5,266,191, issued on Nov. 30, 1993, to Greene et al., now hereby fully incorporated by reference herein. Other separators than the one shown, e.g., retention ponds, etc., may be used as well with the present invention, although the one shown is to be preferred, and the term "separator", as used herein, shall be understood to encompass all such liquids separators.

Separator 20 receives runoff water from a surface, such as a parking lot P as shown, through a drain pipe 22 into the inlet 24 of separator 20, and, after processing by the separator, clean water emerges from the outlet 26 of separator 20 and flows into a drain, not shown in FIG. 1. Separators such as separator 20 have a certain defined maximum rated flow capacity for processing fluids passing therethrough from inlet 24 to outlet 26 that is determined by the various physical dimensions and design parameters of the separator, and, if this rated flow capacity is exceeded, the separator will allow excessive amounts of oil to emerge from outlet 26 because of insufficient processing, instead of the emerging water being relatively pure, as it should be. At such a maximum rated flow capacity, separator 20 will have a maximum permitted internal water level therewithin.

The obstacle to using a separator such as separator 20 to process runoff water from a large parking lot P having relatively low levels of surface contamination is that, if properly sized to handle all of the runoff flow during the most intense rainfall that might occur, the separator would be enormous and prohibitively expensive. To overcome this obstacle, the present invention takes advantage of the unique characteristics of runoff water during a rainfall, as well as the fact that rain comes and goes.

Figure 2:
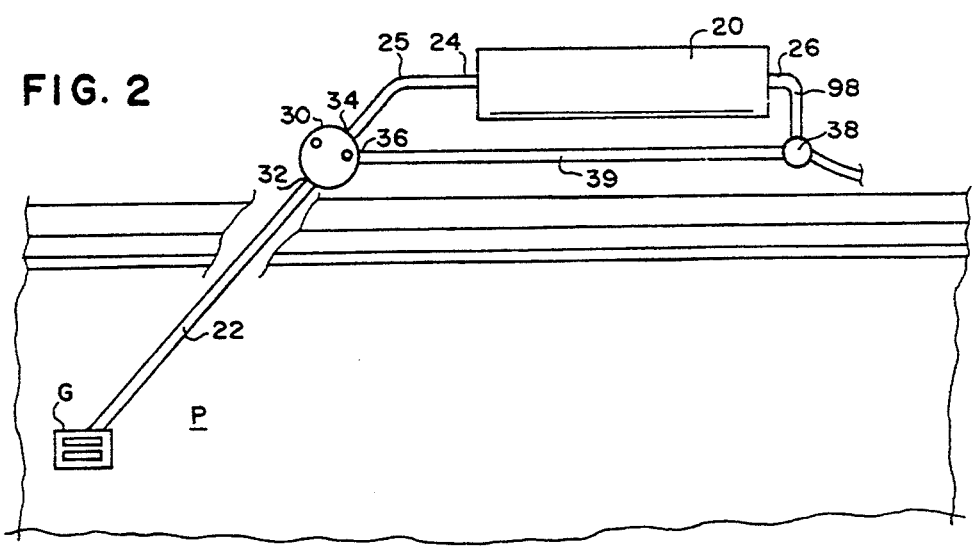
FIG. 2 is a top plan view of the present invention buried alongside a parking lot and interconnected with an immiscible liquids separator.

As shown in the top plan view of FIG. 2, the present invention is a flow control bypass basin apparatus 30 that is typically buried alongside parking lot P and interconnected with similarly-buried separator 20. For the sake of brevity, the present invention will hereinafter be referred to simply as a "bypass basin". Bypass basin 30 receives runoff water from well-known storm grating G of parking lot P through drain pipe 22 to inlet 32 of bypass basin 30, and bypass basin 30 has a primary outlet 34, hereinafter described, leading to the inlet 24 of separator 20 as by through pipe 25. Bypass basin 30 also has a bypass outlet 36, hereinafter described, that leads as through pipe 39 not to separator 20 but instead to a drain or collection cistern 38, schematically represented as shown, which, in turn, leads to a river or a sewage system (not shown) for a municipality. Separator 20 may also empty its processed and cleaned water from its outlet 26 into the same drain 38 as by through pipe 98, or it may empty its cleaned water into another drain.

The theory and insight behind the present invention can be best explained by reference to FIGS. 3 and 4, which show graphs describing rainfall behavior.

Figure 3:
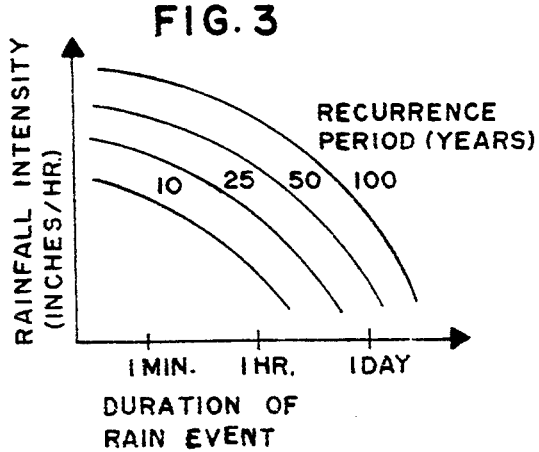
FIG. 3 is a graph showing rainfall intensities graphed versus the duration of the rain event, for various expected recurrence periods in years.

FIG. 3 is a graph showing rainfall intensities graphed versus the duration of the rain event, for various expected recurrence periods in years. It should be understood that the precise nature of the well-known family of curves shown in FIG. 3 will be different for each particular locality because, for example, the rain falls harder and faster in Seattle, Washington, than it does in the middle of the desert. As is well known and shown in FIG. 3, once every ten years, rainfall can be expected that is of a certain high intensity (in inches per hour) and that lasts for a short duration, and rainfall can also be expected that is of a lesser intensity but that lasts for a longer duration. Similarly, once every one hundred years, rainfall can be expected that is of a much higher intensity than every ten years and that lasts for a short duration, and the expected rainfall intensity versus duration may have a shape as shown. Multiplying these expected intensities times the area of the collecting surface, such as parking lot P, gives the expected rainfall in gallons (or liters) per minute.

Figure 4:
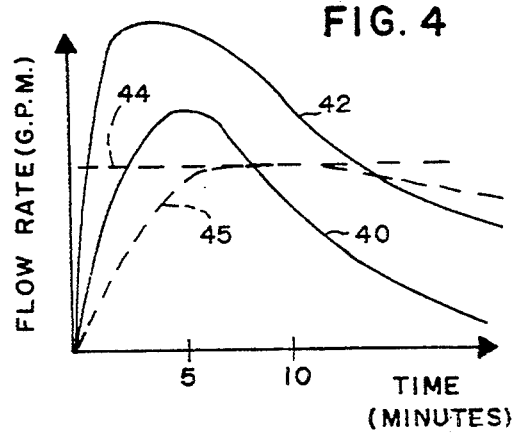
FIG. 4 is a graph of parking lot runoff flow rates graphed versus time, for two typical rainfalls.
Figure 5:
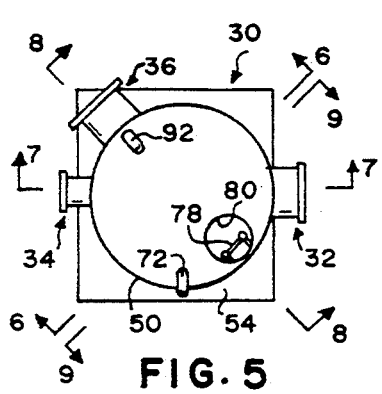
FIG. 5 is a top plan view of the present invention.
Figure 6:
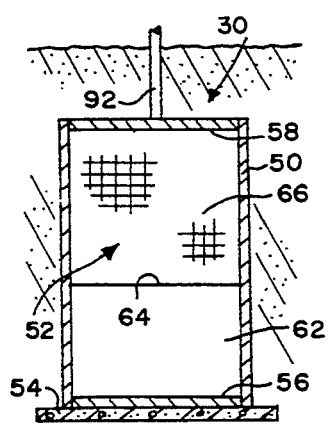
FIG. 6 is a side sectional view of the present invention, taken along the line 6—6 shown in FIG. 5, slightly to one side of a diameter.

FIG. 4 is a typical well-known graph of rainfall runoff flow rates (in gallons per minute) for rainstorms of given intensity; and duration graphed versus time for two typical rainfalls, that corresponding to the rainfall of lesser intensity being denoted by curve 40 and that corresponding to the rainfall of greater intensity being denoted by the similarly-shaped curve 42. As is well-known to those skilled in the art, surface water flowing from the grating G will rise from zero as the rain begins, reach some maximum value as the rainfall intensifies, then taper off as the rainfall subsides. The precise shape of any such rainfall curve will, of course, depend on the local weather conditions where the rainfall occurs.

Before the rain occurs, oils will have accumulated over time on the parking lot from parked cars. Similar oils will accumulate on the roofs of buildings from air conditioning equipment and other machinery thereatop. As the rainfall begins, an oily film is washed from the surface of the parking lot (or building roof) and enters runoff drain pipe 22, and is then passed by bypass basin 30 out its primary outlet 34 and into inlet 24 of separator 20, in a manner hereinafter described. After a few minutes, the runoff water from the parking lot becomes substantially clean because most of the oils have been washed away by the initial downpour. There is little need to process this now substantially-clean water, and, if the processing of that water would exceed the rated flow capacity of separator 20, represented by dotted line 44 in FIG. 4, that water will then be passed out bypass outlet 36 of bypass basin 30 and into drain 38 as through pipe 39, in a manner also hereinafter described. If the downpour later increases in intensity and rises to another peak, the parking lot is now clean, and the subsequent inrush of clean water can be bypassed into drain 238 as well.

It is generally accepted that approximately five minutes of rainfall is required before a surface becomes substantially cleaned of oils and other contamination. On days when very light rainfall occurs, it may take longer for the surface to become cleaned, if at all, but the flow rate into runoff drain pipe will be so small on those days that separator 20 can easily handle the entire flow. It is only in the case of very heavy rainfalls that the need for the present invention becomes evident, because the expected flow rates during such rainfalls will be very large, and would otherwise require an enormous separator 20 if the present invention were not used.

Referring now to FIGS. 5-11, the detailed structure of bypass basin 30 can now be explained.

Bypass basin 30 comprises a tank 50 having an interior 52, an inlet 32, primary outlet means 34 for passing a first portion of the runoff water to separator 20, bypass outlet means 36 for bypassing a second portion of the runoff water to drain 38, and riser tube means 53 for placing bypass outlet means 36 in communication with interior 52 of tank 50, with riser tube means 53 being interposed between bypass outlet means 36 and interior 52 of tank 50.

Tank 50 may have various reinforcing ribs, not shown, for structural reinforcement of tank 50 in a manner well-known to those skilled in the art, and tank 50 may rest on a concrete slab 54 and may be buried beneath the ground, as shown. Tank 50 has a bottom 56 and a ceiling 58, and interior 52 has a lower portion 60 adjacent to bottom 56. Tank 50 preferably has a baffle 62 extending upwardly from bottom 56 of tank 50 toward ceiling 58, with baffle 62 having a top 64 that is below primary outlet means 34, and tank 50 also preferably has a coarse mesh screen 66 extending upwardly from top 64 of baffle 62 to ceiling 58, with inlet 32 being segregated from primary outlet means 34 and riser tube means 53 by baffle 62 and screen 66. Together, baffle 62 and screen 66 form a separation wall, preferably along a diameter of tank 50, that collects heavy solids and trash 68, as well as soil, sand, and grit, and also floatable trash (not shown) such as cigarette butts, ink pens, etc., and prevents this trash from passing into and thereby clogging separator 20. It should be understood that baffle 62 and screen 66 have little or nothing to do with the hydraulic operation of bypass basin 30, and serve only to collect trash, etc. The top 64 of baffle 62 is preferably below primary outlet means 34 so that oil at the surface of the liquid within tank 50 can easily flow to primary outlet means 34.

Tank 50 also preferably has pressure equalization means 70 for placing the interior 52 of tank 50 in communication with the atmosphere and thereby equalizing the pressure within tank 50, with pressure equalization means 70 preferably including a vent pipe 72 having one end 74 open to the interior 52 of tank 50 and having another end 76 extending above ground and open to the atmosphere as shown.

Tank 50 may also have a ladder 78 extending downwardly into the interior 52 of tank 50 from access hatch 80 in the ceiling 58 of tank 50, and access hatch 80, leading upwardly to the ground's surface, preferably has a cover 82 for sealing tank 50 in a manner well-known to those skilled in the art. Periodically, a maintenance worker may climb down ladder 78 to clean tank 50 and remove any collected trash therewithin, in a manner also well-known to those skilled in the art.

Inlet 32 has a certain transverse cross-sectional area, and the sizing of the various cross-sectional areas of inlet 32 and the two outlets, 34 and 36, will be described hereinafter in detail. Preferably, inlet 32 empties the incoming water from the parking lot into the lower portion 60 of tank 550 so that the incoming water doesn't emulsify oil that floats on the surface of the water within tank 50. Were the incoming water to enter tank 50 above the surface of the water therewithin, the clean water that enters tank 50 during the later portions of a rainstorm would have to pass through the oil floating on the surface of the water within tank 50, thereby tending to drag the surface oil down into the tank and also tending to emulsify the surface oil. Also, on cold days, incoming water might not pass completely through the very viscous surface oil, and the water would become emulsified in that oil, rather than vice versa, at which time it would become very difficult to remove that water from the thick oil. With the preferred emptying of inlet 32 into the lower portion 60 of tank 50, oil within the incoming water will rise to the surface of the water within the tank, for subsequent exit through primary outlet means 34, in a manner hereinafter explained.

Primary outlet means 34 has a transverse cross-sectional area substantially smaller than the transverse cross-sectional area of inlet 32, so that, when the rain begins falling, water will accumulate within tank 50 because all of the water that is entering tank 50 cannot flow out of primary outlet means 34 due to its smaller diameter. Preferably, the transverse cross-sectional area of inlet 32 will be approximately four times the transverse cross-sectional area of primary outlet means 34. As water accumulates within tank 50, the water level will rise therewithin as can be seen by comparing FIGS. 7 and 10. Preferably, the mouth 84 of primary outlet means 34 is angled upwardly slightly as shown so as to encourage the flow of fluid into primary outlet means 34 from the surface of the liquid within tank 50, rather than from the lower portion 60 of the interior 52, thereby causing the dirtier, i.e., oilier, water towards the surface to pass into primary outlet means 34.

Bypass outlet means 36 is located a certain height substantially above primary outlet means 34, with that certain height, multiplied by the transverse cross-sectional area of tank 50, determining the volume of liquid that will be accumulated within tank 50 before water begins being bypassed to drain 38. It should be understood that primary outlet means 34 will still be passing water to separator 20 while bypass is occurring through bypass outlet means 36, and that such flow to separator 20 will be at full rated flow through primary outlet means 34 during such bypass. Also, the height of bypass outlet means 36 above the maximum permissible internal water level within separator 20 determines the maximum hydraulic "head pressure" that will be seen at separator 20, and this head pressure, together with frictional losses within pipe 25 and the transverse cross-sectional area of primary outlet means 34, ensures that the rated flow capacity of separator 20 will not be exceeded, in a manner hereinafter described. The transverse cross-sectional area of bypass outlet means 36 is such that the sum of the transverse cross-sectional area of bypass outlet means 36 plus the transverse cross-sectional area of primary outlet means 34 is at least as large as the transverse cross-sectional area of inlet 32 of bypass basin 30, thereby ensuring that once the rising water level reaches the height of bypass outlet means 36, the water level will rise no further because all subsequent water will be bypassed through bypass outlet means 36 into drain 38. In this manner, the maximum head pressure that will be seen at separator 20 may be controlled. For a conservative design, the transverse cross-sectional area of bypass outlet means 36 will preferably be the same as that of inlet 32, thereby ensuring effective bypass of all incoming water once the internal water level reaches the height of bypass outlet means 36.

Riser tube means 53 has an open end 86 disposed in the lower portion 60 of tank 52, with open end 86 being substantially below primary outlet means 34. Riser tube means 53 further has an upper end 88 that is closed to the interior of tank 50. Preferably, riser tube means 53 includes venting means 90 for preventing siphoning by riser tube means 53, with venting means 90 preferably including a vent pipe 92 having one end 94 open to the upper interior of riser tube means 53 and having another end 96 open to the atmosphere as shown, thereby ensuring that the pressure within riser tube means 53, and consequently, at bypass outlet means 36, is equalized to atmospheric pressure, thereby preventing siphoning. Preferably, the transverse cross-sectional area of riser tube means 53 is equal to that of bypass outlet means 36, and therefore, as previously described, preferably equal to that of inlet 32.

It should be noted that, while riser tube means 53 and bypass outlet means 36 are shown in the preferred embodiment within tank 50 with bypass outlet means 36 extending through the wall of tank 50 as shown, an equivalent structure would be to have riser tube means 53 and bypass outlet means 36 located substantially on the exterior of tank 50, as long as the mouth 86 of riser tube means 53 were located in the lower portion 60 of tank 50, substantially below primary outlet means 34, and as long as the height of bypass outlet means 36 substantially above primary outlet means 34 is preserved so as to establish the volume of liquid that will be accumulated within tank 50 before bypassing begins, and further as long as the height of bypass outlet means 36 above the maximum permissible internal water level within separator 20 is maintained so as to control the maximum hydraulic head pressure that will be seen by separator 20.

Figure 7:
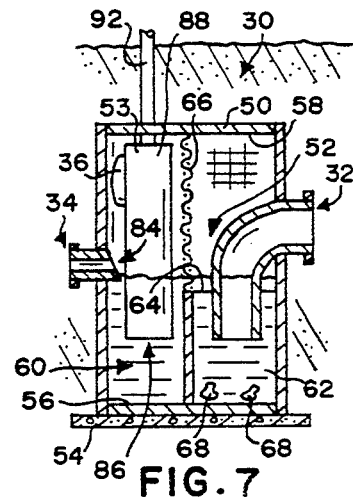
FIG. 7 is a side sectional view of the present invention, taken along the diameter line 7—7 shown in FIG. 5.
Figure 8:
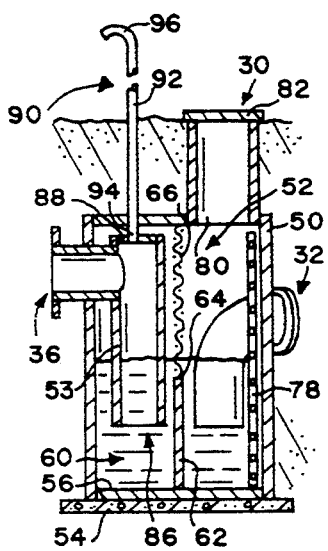
FIG. 8 is a side sectional view of the present invention, taken along the diameter line 8—8 shown in FIG. 5.
Figure 9:
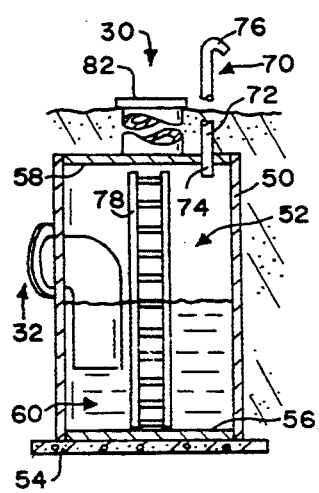
FIG. 9 is a side sectional view of the present invention, taken along the line 9—9 shown in FIG. 5, slightly to one side of a diameter.
Figure 10:
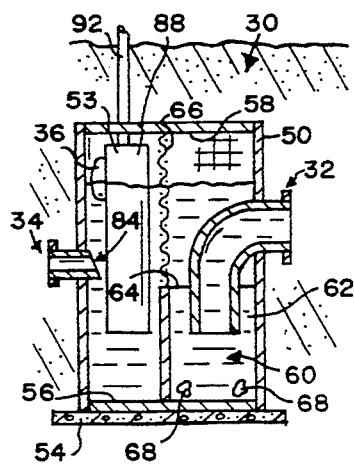
FIG. 10 is a side sectional view of the present invention, similar to that shown in FIG. 7, except with a higher internal water level.

The operation of the present invention can now be explained. Initially, before the rainstorm, the liquid level within tank 50 is as shown in FIG. 7, at the level of primary outlet means 34, it being understood that all liquid above that level will have passed through primary outlet means 34 to separator 20. Because some time has passed since the last rainfall, substantially all of the oil will have risen to the surface within tank 50, although water within tank 50 below this surface oil will be substantially clean. As the rain begins, it washes oil off the surface of the parking lot, into grating G, and into tank 50 through inlet 32. The oil at the surface of the liquid within tank 50 begins to flow out of primary outlet means 34 and into separator 20, together with the initial inrush of oily water presented by the new rain event.

As the rainfall intensity increases, the flow of liquid into tank 50 increases, with dirty water continuing to flow into tank 50 at an increasing rate as shown in FIG. 4, and the liquid level within tank 50 rises because the transverse cross-sectional area of primary outlet means 34 is substantially smaller than that of inlet 32, and the initial inrush of dirty water is thus accumulated within tank 50, with surface oil remaining on the rising surface. As the water level rises, the flow into separator 20 continues, controlled by the transverse cross-sectional area of primary outlet means 34. Once the height of the liquid within tank 50, and thereby also within riser tube means 53, reaches the height of bypass outlet means 36, the cleaner water from the bottom of the tank will be bypassed into drain 38, and any remaining surface oil within tank 50 will not be bypassed into drain 38. As heretofore explained, the water entering tank 50 after the first few minutes of the rainstorm is much cleaner than the water entering the tank at the very beginning of the rainstorm, and this cleaner water can be safely bypassed into the drain. It shall be understood that, when bypassing begins, the water within the lower portion of tank 50 will be substantially clean because most dirty water will have already passed out primary outlet means 34 into separator 20. After the rainfall subsides, bypassing through bypass outlet means 36 will cease as the liquid level drops within tank 50, and the accumulated dirty and oily liquid will exit through primary outlet means 34 and into separator 20 for subsequent processing.

It should be understood that bypassing will only occasionally occur during rainfall because the accumulation within bypass basin 30, combined with the flow rate out of primary outlet means 34, will, in most cases, be sufficient to pass all water from the rain event to separator 20. It is only when a huge downpour occurs that bypassing will occur. The net effect of bypass basin 30 will be to smooth the flow rate seen by separator 20 from that shown in FIG. 4 by curves 40 and 42 to that shown by curve 45.

Figure 11:
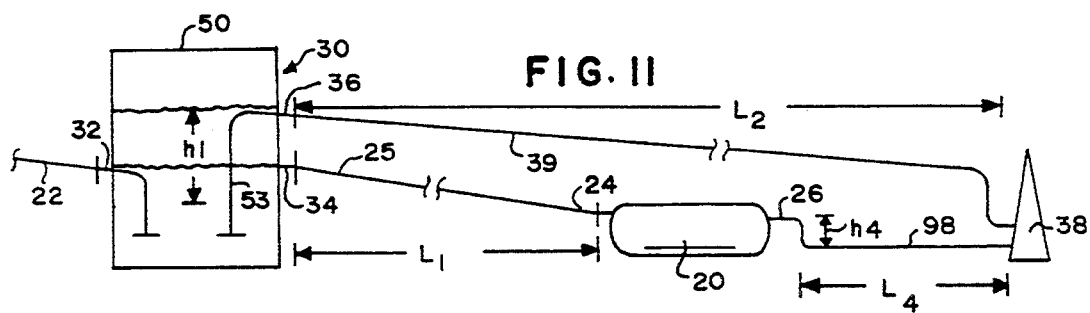
FIG. 11 is a schematic flow diagram of the present invention interconnected with an immiscible liquids separator, showing various distances and heights and explaining the theory of the invention's operation.

Referring to FIG. 11, various equations can now be explained that can be used to design and size bypass basin 30 for any particular requirements. For the following discussion, variables with the subscript "1" will be understood to refer to primary outlet means 34, variables with the subscript "2" will be understood to refer to bypass outlet means 36, and variables with the subscript "3" will be understood to refer to inlet 32.

Letting $m_1$, $m_2$, and $m_3$ respectively designate the liquid masses moving through primary outlet means 34, bypass outlet means 36, and inlet 32, and letting $m_{ACC}$ represent the liquid mass accumulating within tank 50, conservation of mass requires:

$$\frac{d}{dt} m_3 = \frac{d}{dt} m_1 + \frac{d}{dt} m_2 + \frac{d}{dt} m_{ACC}$$

Because the fluids under consideration here are essentially incompressible, this equation can be readily changed into one dealing with flow rates of the fluids. Letting $Q_1$, $Q_2$, and $Q_3$ respectively designate the flow rates (gallons per minute or liters per minute) through primary outlet means 34, bypass outlet means 36, and inlet 32, and letting $Q_{ACC}$ represent the liquid accumulating within tank 50, the corresponding equations become:

$$Q_3 = Q_1 + Q_2 + Q_{ACC}$$

where $$Q_{ACC} = A_T \frac{d}{dt} \Delta h_1$$

with $\Delta h_1$ being defined as the height of the surface of the liquid within tank 50 above the surface of the liquid in separator 20, and with $A_T$ being defined as the transverse cross-sectional area of tank 50.

For any accumulation of liquid within tank 50 to take place, primary outlet means 34 must be designed and sized such that it provides more resistance to the liquid flow therethrough than does inlet 32, and bypass basin 30 has the further constraint that, when operating at full capacity, i.e., when the liquid level within tank 50 is at its maximum height of bypass outlet means 36, the flow rate through primary outlet means 34 must not exceed the maximum permissible flow rate through separator 20. The flow rate through primary outlet means 34 and pipe 25 when pipe 25 is operating under so-called "full-flow" conditions, is determined by the following equation:

$$Q_1 = \sqrt{2g\Delta h_1} \, A_1 - F_1$$

where $A_1$ is defined to be the transverse cross-sectional area of primary outlet means 34 and pipe 25; g is the well-known gravitational constant; and $F_1$ represents the total frictional losses within pipe 25 between bypass basin 30 and separator 20. Those skilled in the art will recognize that $F_1$ is a function of the size of pipe 25, the length $L_1$ of pipe 25 from bypass basin 30 to separator 20, the flow rate $Q_1$, the density and viscosity of the flowing liquid, etc.

Initially, before bypassing begins, there is no flow through bypass outlet means 36, thereby causing $Q_2$ to be equal to zero so that the flow rate equation becomes:

$$Q_3 = Q_1 + Q_{ACC}$$

or, by substitution, $$Q_3 = \sqrt{2g\Delta h_1} \, A_1 - F_1 + A_T \frac{d}{dt} \Delta h_1$$

or, equivalently, $$\frac{d}{dt} \Delta h_1 = [Q_3 - \sqrt{2g} \, A_1(\Delta h_1)^{\frac{1}{2}} + F_1] \frac{1}{A_T}$$

In practice, the solution of this equation can be somewhat difficult, and so several simplifications may be used to make the design of bypass basin 30 somewhat more tractable, and thereby also yielding a very conservative design.

The first step in this simplification is to determine what liquid height $\Delta h_1$ within bypass basin 30 would produce the maximum rated flow through separator 20 because of the resulting hydraulic head pressure at inlet 24 of separator 20. Once this height is determined, the height of bypass outlet means 36 is then known, given the depth at which tank 50 will be buried. Those skilled in the art will readily be able to determine the height of the liquid level within any given separator 20 at its maximum rated flow. Also, the frictional losses within pipe 25 can be readily calculated in a manner well-known to those skilled in the art.

When designing bypass basin 30 so that all of the initial oily and dirty water is accumulated within bypass basin 30 for later passing to separator 20, the size of the surface, such as parking lot P, that will drain into bypass basin 30 is known. Those skilled in the art can readily calculate the time for water to flow to bypass basin 30 from the most remote portion of the surface. An assumption that can be made to simplify calculations is that the shape of the rainfall curve shown in FIG. 4 does not rise smoothly as shown, but that the shape is instead that of a well-known "step function", with the maximum intensity of the rainfall occurring immediately. Thus, knowing this maximum time during which the initial dirty and oily water will flow into bypass basin 30 and thereby the maximum volume of rainwater that is expected to occur during the initial moments of the rainstorm until the parking lot has been washed clean, and also knowing the maximum liquid height $\Delta h_1$ within bypass basin 30 that can be permitted, the transverse cross-sectional area $A_T$ of tank 50 can now be calculated that will allow accumulation of this initial volume of dirty water within tank 50 for the given time prior to bypass. When bypass begins, a certain minimum amount of water must have already passed into separator 30, sufficient to have washed parking lot P substantially clean, as measured by some local environmental standard. It will be assumed permissible to bypass all subsequent water into drain 38, with the understanding that flow will still be occurring through primary outlet means 34 at full rate during bypass. The specific parameters of any particular such design will be based on the frequency with which the rated capacity of the separator will be exceeded, i.e., whether a so-called "100 year rainfall" or a so-called "25 year rainfall", etc., is to be successfully accommodated. The volume of water that must be accumulated will now be understood to be a function of the weather patterns at the site where separator 20 and bypass basin 30 are located, as well as of the time required, at a given rainfall intensity and separator flow rate, for parking lot P to have been washed relatively clean.

In practice, such a design is very conservative. In the first place, the rainfall will not reach its maximum intensity immediately, but instead will rise as shown in FIG. 4. Also, pipe 22 from grate G will also act as an accumulator, as will the parking lot itself, to a certain degree, thereby easing the load imposed upon bypass basin 30. Also, the above simplified calculations have ignored the fact that, while water is accumulating within bypass basin 230, flow will simultaneously be occurring through primary outlet means 34, thereby causing less accumulation to occur within tank 50.

For a typical design, it is preferred that:

$$D_3 = D_2 = 2D_1$$

where $D_1$, $D_2$, and $D_3$ respectively designate the pipe diameters of primary outlet means 34 and pipe 25, bypass outlet means 36 and pipe 39, and inlet 32 and pipe 22. The transverse cross-sectional areas of these pipes therefore obey the relationship:

$$A_3 = A_2 = 4A_1$$

By definition, the flows through each of these three pipes is related to its transverse cross-sectional area and average liquid velocities by:

$$Q_1 = A_1 \bar{V}_1$$

$$Q_2 = A_2 \bar{V}_2$$

$$Q_3 = A_3 \bar{V}_3$$

At maximum rated flow, i.e., when the height of the liquid within bypass basin 30 is at bypass outlet means 36, there is no accumulation within tank 50 because all excess water is being bypassed through bypass outlet means 36, and therefore:

$$Q_3 = Q_1 + Q_2$$

When bypass pipe 39 is running at maximum design capacity, the average velocity in pipe 25 to separator 20 follows the equation:

$$V_1 = \frac{Q_1}{A_1} = \left(\frac{Q_2}{A_2}\right)^{\frac{2}{3}}$$

Because the pressure within tank 50 and riser pipe 53 is equalized to be atmospheric pressure by vent pipes 72 and 92, the well-known Manning equation can now be used to determine the flow rate through bypass basin 30, such that:

$$v = \frac{1.486}{n} r^{\frac{2}{3}} S^{\frac{1}{2}}$$

where n is the well-known roughness factor for the pipe, r is the hydraulic radius of the pipe, and S is the slope of the pipe in vertical rise/fall per horizontal unit length of pipe. Multiplying both sides of this equation by the transverse cross-sectional area A of the pipe gives:

$$Q = \frac{1.486}{n} A r^{\frac{2}{3}} S^{\frac{1}{2}}$$

Typical and well-known values of n are 0.01 for concrete pipe and 0.013 for steel pipe.

For a typical installation, $L_1$, the length of pipe 25 from bypass basin 30 to separator 20, will be twenty to eighty times the diameter of pipe 25; $L_4$, the length of pipe 98 from separator 20 to drain 38, will be ten to eighty times the diameter of pipe 98; $h_4$, the height of outlet 26 of separator 20 above drain 38, will be four times the diameter of pipe 98; the slope of pipe 39 will be such that, at maximum design flow rate, it is steep enough not to allow substantial additional accumulation during bypass; and $L_2$, the length of pipe 39 from bypass basin 30 to drain 38, will be greater than or equal to the sum of lengths $L_1$ and $L_4$.

Using such an approach, the following table shows various preliminary calculations and values expected for various rainfall occurrences at a particular location, with the rainfall assumed to occur on a surface that is twenty per cent grass and eighty per cent paved and with a runoff factor of 0.85, with flow rates given in cubic feet per second ("C.F.S."), and with time until bypass being given in minutes as measured from the beginning of an intense rainfall of the given recurrence frequency:

TABLE 1

| Freq. (years) | Freq. Factor | Slope (avg.) | Process Water (C.F.S.) | Runoff in C.F.S. | Separ. Flow (C.F.S.) | Time Until Bypass |
|---|---|---|---|---|---|---|
| 100 | 1.5 | 1% | 0.89 | 28.95 | 4.86 | 0.75 |
| 50 | 1.2 | 1% | 0.89 | 23.16 | 4.5 | 1.5 |
| 25 | 1.0 | 1% | 0.89 | 19.3 | 4.1 | 3 |
| 10 | 0.8 | 1% | 0.89 | 15.4 | 3.92 | 5 |
| 5 | 0.6 | 1% | 0.89 | 11.6 | 3.74 | 7 |
| 2 | 0.4 | 1% | 0.89 | 7.7 | 3.74 | 10 |

The above column entitled "Process Water" should be understood to be an additional constant load imposed on the separator and bypass basin, unrelated to rainfall runoff, consisting of additional effluent that must be constantly processed by the separator and bypass basin combination. This additional load merely adds a constant flow to the inlet of bypass basin 30 that accordingly increases the necessary capacity of the bypass basin and downstream separator.

Although the present invention has been described and illustrated with respect to a preferred embodiment and a preferred use therefor, it is not to be so limited since modifications and changes can be made therein which are within the full intended scope of the invention.

We claim:

1. A flow control bypass basin for receiving runoff water from a surface and for passing a first portion of said runoff water to an inmiscible liquids separator and for bypassing a second portion of said runoff water not to said separator but instead to a drain, said bypass basin comprising:
   (a) a tank having a bottom and an interior, said interior having a lower portion adjacent to said bottom;
   (b) an inlet in communication with the interior of said tank, said inlet having a transverse cross-sectional area;
   (c) primary outlet means in communication with the interior of said tank for passing said first portion of said runoff water to said separator, said primary outlet means having a transverse cross-sectional area substantially smaller than the transverse cross-sectional area of said inlet;
   (d) bypass outlet means in communication with the interior of said tank for bypassing said second portion of said runoff water not to said separator but instead to said drain, said bypass outlet means having a transverse cross-sectional area such that the sum of said transverse cross-sectional area of said bypass outlet means plus the transverse cross-sectional area of said primary outlet means is at least as large as the transverse cross-sectional area of said inlet, said bypass outlet means being located a certain height substantially above said primary outlet means, thereby defining a liquid accumulation volume therebetween; and
   (e) riser tube means, interposed between said bypass outlet means and the interior of said tank, for placing said bypass outlet means in communication with the interior of said tank, said riser tube means having an open end disposed in said lower portion of said tank substantially below said primary outlet means and having an upper end closed to the interior of said tank.

2. The bypass basin as recited in claim 1, in which said bypass basin further includes pressure equalization means for equalizing the pressure within said tank to atmospheric pressure; and further in which said bypass basin further includes venting means for preventing siphoning by said riser tube means, said venting means including a vent pipe placing said upper end of said riser tube means in communication with the atmosphere.

3. The bypass basin as recited in claim 1, in which said inlet empties into said lower portion of said interior of said tank.

4. The bypass basin as recited in claim 3, in which said primary outlet means receives said first portion of said runoff water substantially above the bottom of said tank, and further in which said tank has a ceiling and said bypass basin further comprises a baffle extending upwardly from said bottom of said tank, said baffle having a top that is below said primary outlet means; and further in which said bypass basin further comprises a screen extending upwardly from the top of said baffle to the ceiling of said tank, said inlet being segregated from said primary outlet means and said open end of said riser tube means by said baffle and said screen.

5. The bypass basin as recited in claim 1, in which said primary outlet means receives said first portion of said runoff water substantially above the bottom of said tank, said primary outlet means having an upwardly-angled mouth and receiving said first portion of said runoff water through said upwardly-angled mouth.

6. The bypass basin as recited in claim 1, in which said tank has a ceiling and said bypass basin further comprises a baffle extending upwardly from said bottom of said tank, said baffle having a top that is below said primary outlet means; and further in which said bypass basin further comprises a screen extending upwardly from the top of said baffle to the ceiling of said tank, said inlet being segregated from said primary outlet means and said open end of said riser tube means by said baffle and said screen.

7. In combination, a flow control bypass basin, an immiscible liquids separator, and a drain; said separator having an inlet, a maximum rated flow rate thereinto, and a maximum permissible internal water level therewithin; said bypass basin receiving runoff water from a surface and passing a first portion of said runoff water to the inlet of said separator, said bypass basin bypassing a second portion of said runoff water not to said separator but instead to said drain, said bypass basin comprising:

(a) a tank having a bottom and an interior, said interior having a lower portion adjacent to said bottom;

(b) an inlet in communication with the interior of said tank, said inlet of said bypass basin having a transverse cross-sectional area;

(c) primary outlet means in communication with the interior of said tank for passing said first portion of said runoff water to the inlet of said separator, said primary outlet means having a transverse cross-sectional area substantially smaller than the transverse cross-sectional area of said inlet of said bypass basin;

(d) bypass outlet means in communication with the interior of said tank for bypassing said second portion of said runoff water not to said separator but instead to said drain, said bypass outlet means having a transverse cross-sectional area such that the sum of said transverse cross-sectional area of said bypass outlet means plus the transverse cross-sectional area of said primary outlet means is at least as large as the transverse cross-sectional area of said inlet of said bypass basin, said bypass outlet means being located a first certain height substantially above said primary outlet means, thereby defining a liquid accumulation volume therebetween within said tank, said bypass outlet means further being located a second certain height above said maximum permissible internal water level within said separator, said second certain height being not greater than that which would produce a hydraulic head pressure at the inlet of said separator that would cause the flow of said first portion of said runoff water into said separator to be in excess of said maximum rated flow rate of said separator; and (e) riser tube means, interposed between said bypass outlet means and the interior of said tank, for placing said bypass outlet means in communication with the interior of said tank, said riser tube means having an open end disposed in said lower portion of said tank substantially below said primary outlet means and having an upper end closed to the interior of said tank.

8. The combination as recited in claim 7, in which said bypass basin further includes pressure equalization means for equalizing the pressure within said tank to atmospheric pressure; and further in which said bypass basin further includes venting means for preventing siphoning by said riser tube means, said venting means including a vent pipe placing said upper end of said riser tube means in communication with the atmosphere.

9. The combination as recited in claim 7, in which said inlet of said bypass basin empties into said lower portion of said interior of said tank.

10. The combination as recited in claim 9, in which said primary outlet means receives said first portion of said runoff water substantially above the bottom of said tank, and further in which said tank has a ceiling and said bypass basin further comprises a baffle extending upwardly from said bottom of said tank, said baffle having a top that is below said primary outlet means; and further in which said bypass basin further comprises a screen extending upwardly from the top of said baffle to the ceiling of said tank, said inlet of said bypass basin being segregated from said primary outlet means and said open end of said riser tube means by said baffle and said screen.

11. The combination as recited in claim 7, in which said primary outlet means receives said first portion of said runoff water substantially above the bottom of said tank, said primary outlet means having an upwardly-angled mouth and receiving said first portion of said runoff water through said upwardly-angled mouth.

12. The combination as recited in claim 7, in which said tank has a ceiling and said bypass basin further comprises a baffle extending upwardly from said bottom of said tank, said baffle having a top that is below said primary outlet means; and further in which said bypass basin further comprises a screen extending upwardly from the top of said baffle to the ceiling of said tank, said inlet of said bypass basin being segregated from said primary outlet means and said open end of said riser tube means by said baffle and said screen.

13. The combination as recited in claim 7, in which local environmental regulations, where said separator and said bypass basin are situated, define a certain volume of rainfall runoff water required to substantially clean said surface, and in which said liquid accumulation volume of said tank, plus five minutes times the maximum rated flow rate of said separator, is at least as large as said certain volume of rainfall runoff water required to substantially clean said surface.

14. In combination, a flow control bypass basin, an immiscible liquids separator, and a drain; said separator having an inlet, a maximum rated flow rate thereinto, and a maximum permissible internal water level therewithin; said bypass basin receiving runoff water from a surface and passing a first portion of said runoff water to the inlet of said separator, said bypass basin bypassing a second portion of said runoff water not to said separator but instead to said drain, said bypass basin comprising:

(a) a tank having a bottom and an interior, said interior having a lower portion adjacent to said bottom;

(b) an inlet in communication with the interior of said tank, said inlet of said bypass basin having a transverse cross-sectional area and emptying into said lower portion of said interior of said tank;

(c) primary outlet means in communication with the interior of said tank for passing said first portion of said runoff water to the inlet of said separator, said primary outlet means having a transverse cross-sectional area substantially smaller than the transverse cross-sectional area of said inlet of said bypass basin, said primary outlet means receiving said first portion of said runoff water substantially above the Bottom of said tank and said primary outlet means having an upwardly-angled mouth and receiving said first portion of said runoff water through said upwardly-angled mouth;

(d) bypass outlet means in communication with the interior of said tank for bypassing said second portion of said runoff water not to said separator but instead to said drain, said bypass outlet means having a transverse cross-sectional area such that the sum of said transverse cross-sectional area of said bypass outlet means plus the transverse cross-sectional area of said primary outlet means is at least as large as the transverse cross-sectional area of said inlet of said bypass basin, said bypass outlet means being located a first certain height substantially above said primary outlet means, thereby defining a liquid accumulation volume therebetween within said tank, said bypass outlet means further being located a second certain height above said maximum permissible internal water level within said separator, said second certain height being not greater than that which would produce a hydraulic head pressure at the inlet of said separator that would cause the flow of said first portion of said runoff water into said separator to be in excess of said maximum rated flow rate of said separator;

(e) riser tube means, interposed between said bypass outlet means and the interior of said tank, for placing said bypass outlet means in communication with the interior of said tank, said riser tube means having an open end disposed in said lower portion of said tank substantially below said primary outlet means and having an upper end closed to the interior of said tank;

(f) pressure equalization means for equalizing the pressure within said tank to atmospheric pressure; and (g) venting means for preventing siphoning by said riser tube means, said venting means including a vent pipe placing said upper end of said riser tube means in communication with the atmosphere.

15. The combination as recited in claim 14, in which said tank has a ceiling and said bypass basin further comprises a baffle extending upwardly from said bottom of said tank, said baffle having a top that is below said primary outlet means; and further in which said bypass basin further comprises a screen extending upwardly from the top of said baffle to the ceiling of said tank, said inlet of said bypass basin being segregated from said primary outlet means and said open end of said riser tube means by said baffle and said screen.

16. The combination as recited in claim 14, in which local environmental regulations, where said separator and said bypass basin are situated, define a certain volume of rainfall runoff water required to substantially clean said surface, and in which said liquid accumulation volume of said tank, plus five minutes times the maximum rated flow rate of said separator, is at least as large as said certain volume of rainfall runoff water required to substantially clean said surface.

* * * * *